United States Patent [19]
Fujimura

[11] Patent Number: 5,127,598
[45] Date of Patent: Jul. 7, 1992

[54] SEAT BELT RETRACTOR
[75] Inventor: Yoshiichi Fujimura, Shiga, Japan
[73] Assignee: Takata Corporation, Tokyo, Japan
[21] Appl. No.: 578,116
[22] Filed: Sep. 6, 1990
[30] Foreign Application Priority Data
   Sep. 11, 1989 [JP] Japan .................. 64-235345
[51] Int. Cl.$^5$ .................. B60R 22/40; B60R 22/42
[52] U.S. Cl. .................. 242/107.2; 242/107.4 A
[58] Field of Search .................. 242/107.2, 107.4 A, 242/107.4 B, 107.4 C; 280/806, 808

[56] References Cited
U.S. PATENT DOCUMENTS
4,241,886 12/1980 Maekawa et al. .................. 242/107.2
4,928,902 5/1990 Tsuji .................. 242/107.2

Primary Examiner—John M. Jillions
Attorney, Agent, or Firm—Armstrong, Nikaido, Marmelstein, Kubovcik & Murray

[57] ABSTRACT

Disclosed is a seat belt retractor in which first and second locking members 14, 16 are engaged with a ratchet wheel 13 independently of each other via a link member 18 when sudden acceleration is sensed. Owing to this engagement between the first and second locking members 14, 16 and the ratchet wheel 13, first emergency locking means 15 locks a reel shaft 11 against rotation while second emergency locking means 17 locks a seat belt 12. Accordingly, the first emergency locking means 15 and second emergency locking means 17 operate independently of each other, and it is possible to readily adjust the timing at which the reel shaft is locked against rotation and the timing at which the seat belt is locked by being clamped.

1 Claim, 9 Drawing Sheets

SEAT BELT RETRACTOR

BACKGROUND OF THE INVENTION

This invention relates to a seat belt retractor which locks a seat belt against extraction by the action of sudden acceleration.

A seat belt apparatus installed at the seat of an automobile or the like for the purpose of protecting a passenger at the occurrence of an emergency is so adapted that the seat belt is taken up by a retractor device, equipped with an emergency locking mechanism, attached to a reinforced member of the vehicle body. When the passenger has fastened the seat belt, movement of the passenger ordinarily is accompanied by extraction of the seat belt from the retractor device so that passenger movement will not be restrained. On the other hand, when an emergency situation such as a collision occurs, an impact force or the like is sensed and the emergency locking mechanism is actuated to halt the rotation of a reel shaft about which the seat belt has wound. This stops the extraction of the seat belt and restrains violent movement of the passenger, thereby protecting the passenger against injury.

Though the above described emergency locking mechanism is capable of reliably stopping the rotation of the reel shaft upon about which the seat belt has been wound, there are cases where an excess amount of the seat belt that has been taken up on the reel shaft is pulled out owing to tightening of the seat belt, despite the fact that rotation of the reel shaft has been halted.

The applicant has already filed a patent application (Japanese Patent Application No. 63-185522) for a seat belt retractor adapted to prevent extraction of a seat belt due to this tightening of the seat belt.

FIG. 6 is a diagram illustrating the seat belt retractor according to this previously filed patent application.

As shown in FIG. 6, the seat belt retractor includes first emergency locking means 5 having a ratchet wheel 3 coaxially and integrally attached to a reel shaft 2 which rotates freely in accordance with extraction and take up of a seat belt 1 wound upon a reel, and a locking member 4a capable of being positionally displaced to engage with or disengage from the ratchet wheel 3, the reel shaft being locked against rotation by engaging the locking member 4a with the ratchet wheel 3, and second emergency locking means 9 having a sliding clamp member 7 attached to a case 6 so as to be capable of sliding in the directions in which the seat belt 1 is pulled out and taken up, and a turning clamp member 8 disposed opposite the sliding clamp member 7 for clamping and locking the seat belt 1 by operating in association with the locking action of the first emergency locking means 5.

The second emergency locking means 9 shown in FIG. 6 has a link member 4b actuated by displacement of the locking member 4a toward the ratchet wheel 3.

With the seat belt retractor having this construction, pull out of the seat belt due to tightening is prevented, thereby providing a seat belt retractor having a higher degree of reliability.

However, it has been clarified that since the first emergency locking means 5 and second emergency locking means 9 are actuated via the common locking member 4b by relying upon the link member 4b, it is difficult to finely adjust the mutual actuation timing of the two locking mechanisms.

SUMMARY OF THE INVENTION

Accordingly, an object of the present invention is to provide a seat belt retractor in which it is possible to readily adjust the timing at which the reel shaft is locked against rotation and the timing at which the seat belt is locked by being clamped.

According to the present invention, the foregoing object is attained by providing a seat belt retractor comprising first emergency locking means having a ratchet wheel coaxially and integrally attached to a reel shaft which rotates freely in accordance with extraction and take up of a wound seat belt, and a first locking member capable of being positionally displaced to engage with or disengage from the ratchet wheel, the reel shaft being locked against rotation by engaging the first locking member with the ratchet wheel, second emergency locking means having a second locking member capable of being positionally displaced to engage with or disengage from the ratchet wheel, the seat belt being clamped and locked by engaging the second locking member with the ratchet wheel, and a link member for engaging the first and second locking members with and disengaging them from the ratchet wheel independently of each other in response to detection of sudden acceleration.

In accordance with the seat belt retractor of the present invention constructed as set forth above, the first and second locking members are engaged with the ratchet wheel independently of each other via the link member when sudden acceleration is sensed. Owing to this engagement between the first and second locking members and the ratchet wheel, the first emergency locking means locks the reel shaft against rotation while the second emergency locking means locks the seat belt.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 1 illustrates an embodiment of a seat belt retractor according to the present invention, in which (a) is a front view of the embodiment, (b) a right-side view of the embodiment, and (c) a sectional view taken along line A—A in FIG. 1(a);

FIG. 2 illustrates first emergency locking means in this embodiment of the seat belt retractor, in which (a) is an exploded perspective view of the first emergency locking means and (b) a front view of a link member in the first emergency locking means;

FIG. 4 is useful in describing the operation of the first and second emergency locking means, in which (a) is a diagram showing the emergency locking means in a non-actuated state and (b) is a diagram showing the emergency locking means in the actuated state;

FIG. 6 is a diagram for describing a seat belt retractor according to the prior art.

DESCRIPTION OF THE PREFERRED EMBODIMENT

An embodiment of the present invention will now be described with reference to the drawings.

Figure 1A:
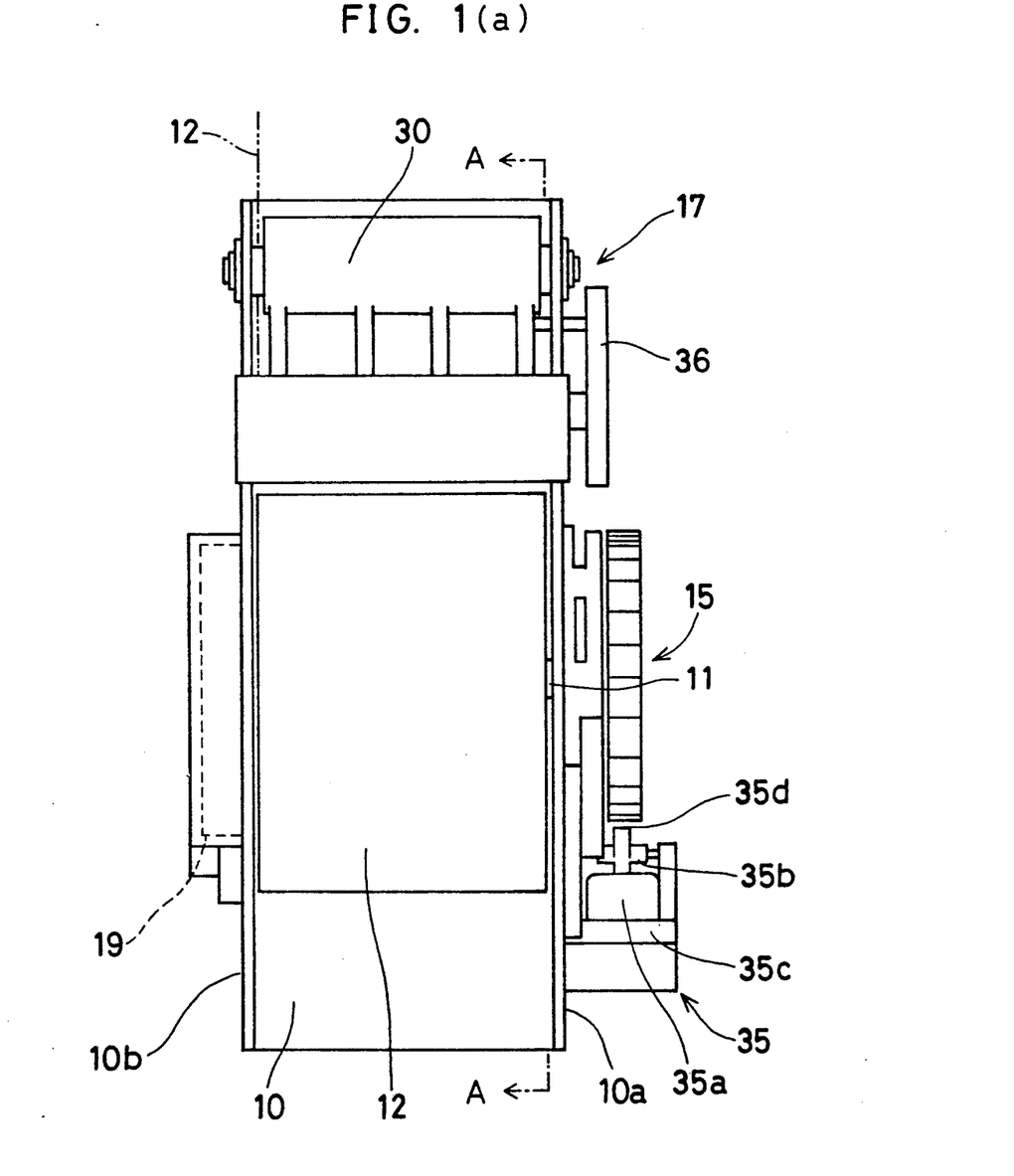
Figure 1B:
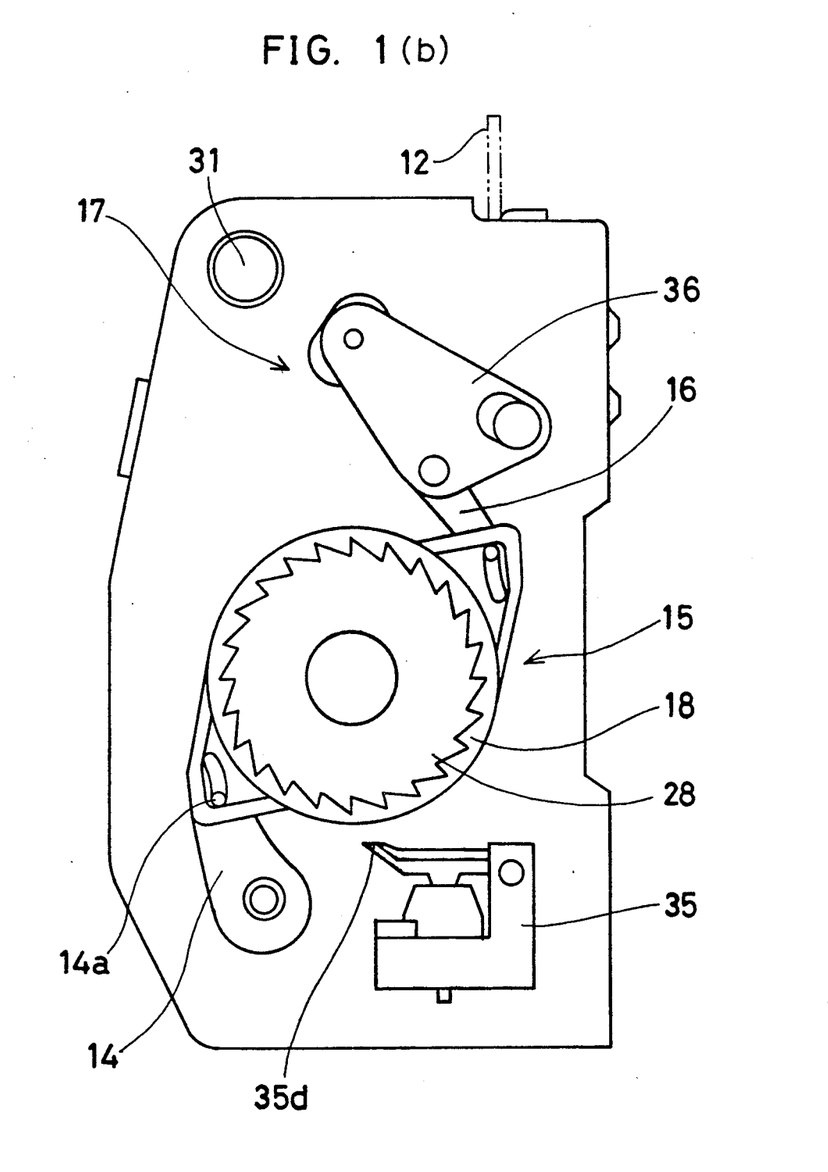
Figure 1C:
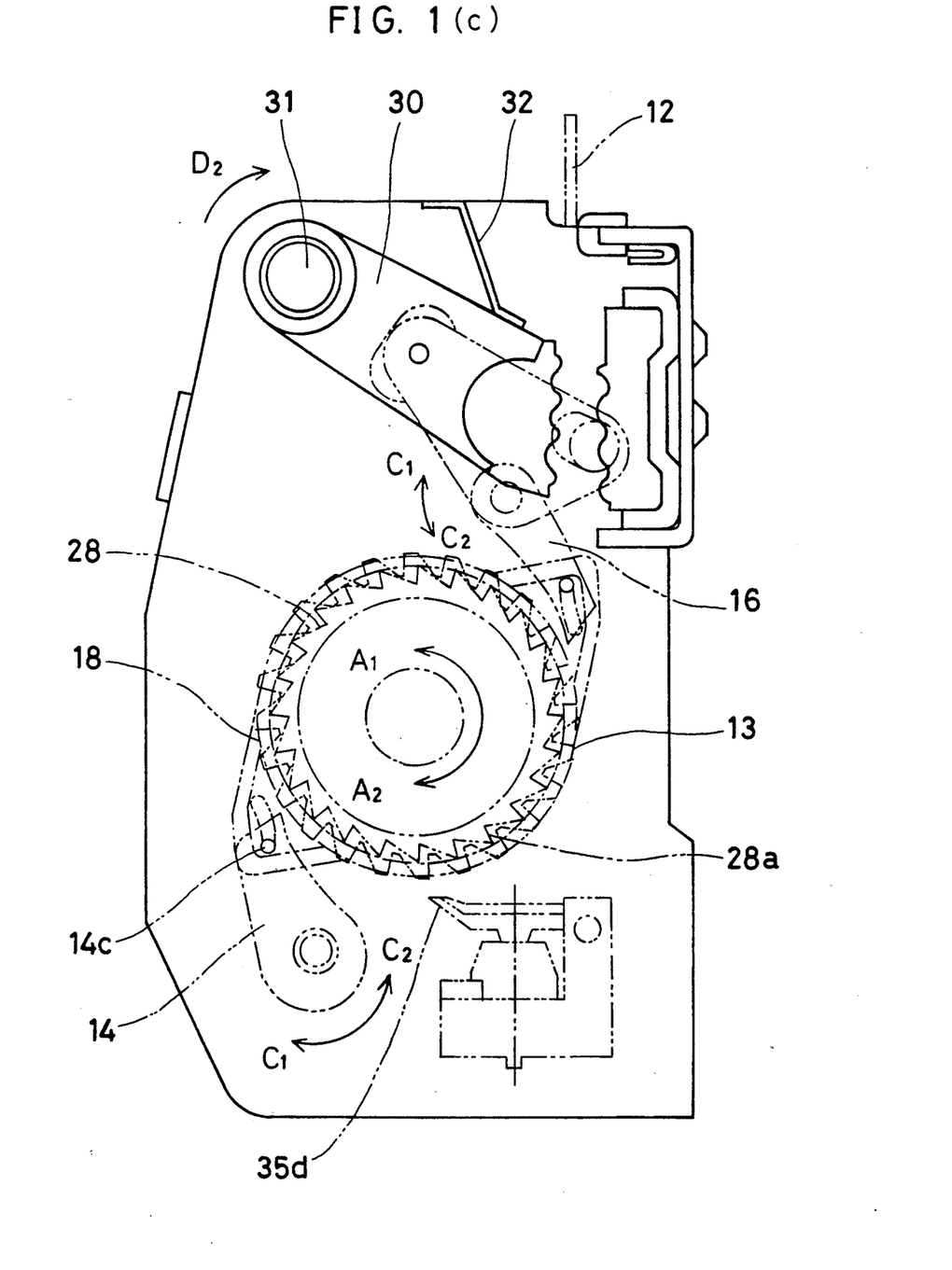

A seat belt retractor according to the present invention shown in FIGS. 1(a) through 1(c) comprises first emergency locking means 15 having a reel shaft 11 for rotating freely in accordance with extraction and take up of a wound seat belt 12, a ratchet wheel 13 [illustrated in FIG. 1(c)] coaxially and integrally attached to the reel shaft 11, and a first locking member 14 capable of being positionally displaced to engage with or disengage from the ratchet wheel 13, the reel shaft 11 being locked against rotation by engaging the first locking member 14 with the ratchet wheel 13, second emergency locking means 17 having a second locking member 16 capable of being positionally displaced to engage with or disengage from the ratchet wheel 13, the seat belt 12 being clamped and locked by engaging the second locking member 16 with the ratchet wheel 13, and a link member (hereinafter referred to as locking ring) 18 for engaging the first and second locking members 14, 16 with and disengaging them from the ratchet wheel 13 independently of each other in response to detection of sudden acceleration.

Connected to the other end of the reel shaft 11 is one end of a restoration spring 19, whose other end is fixed to side face 10b. Accordingly, the arrangement is such that the seat belt 12 is pulled out against the biasing force and taken up by the biasing force of the restoration spring 19.

The first emergency locking means 15 will be described in further detail with reference to FIGS. 2(a), (b).

Figure 2A:
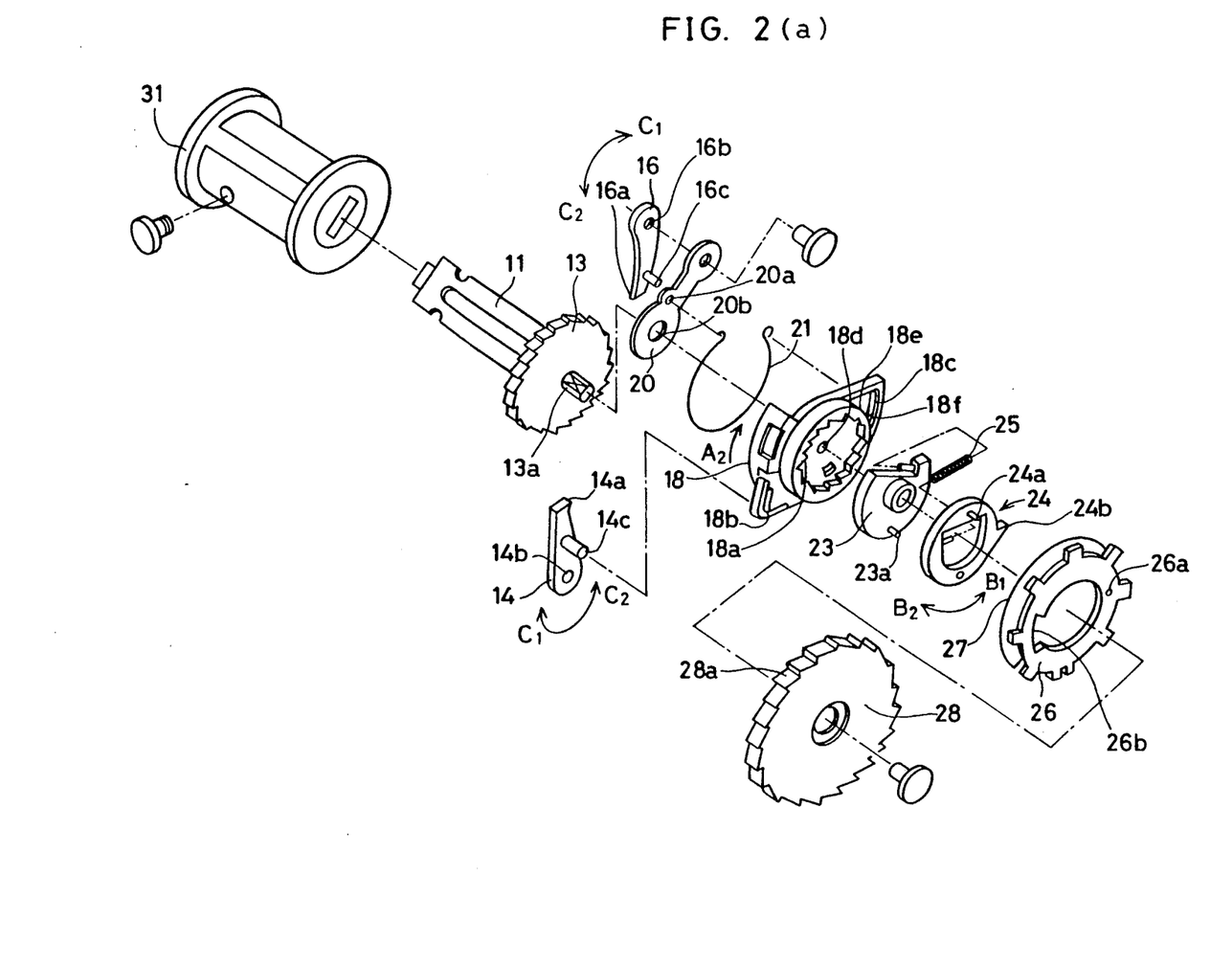
Figure 2B:
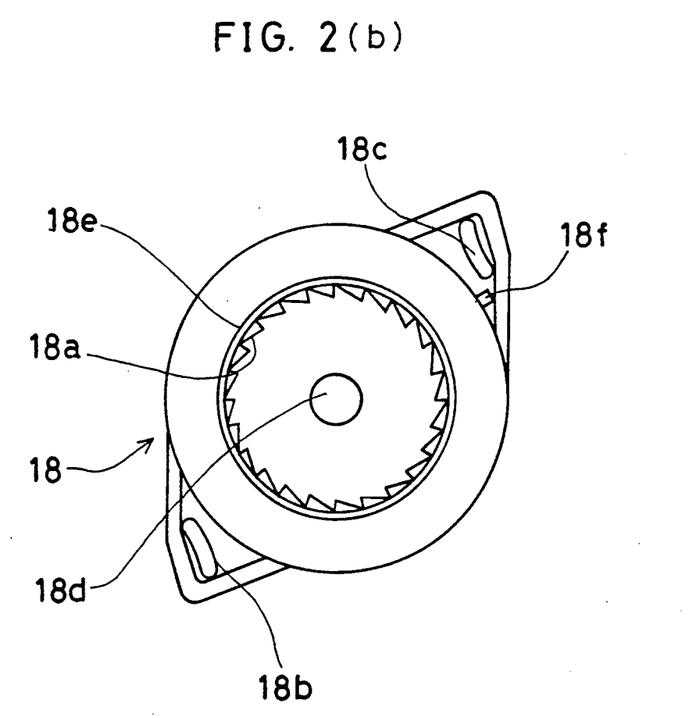

As shown in FIG. 2(a), a projection 13a coaxial with the reel shaft 11 is formed on the outer side of the ratchet wheel 13, which is secured to one end of the reel shaft 11.

Loosely fitted on the projection 13a are a tie plate 20 via a through-hole 20b formed in one end portion thereof, a spring member 21 one end of which is anchored to a spring hanger 20a provided on the approximate central portion of the tie plate 20, and the locking ring 18, which serves as the link member, engaged with the other end of the spring member 21 via a spring hanger 18f formed in its central portion.

As shown also in FIG. 2(b), the locking ring 18 is provided, in mutually opposing outer peripheral portions thereof, with a first locking member guide hole 18b and a second locking member guide hole 18c flanking the centrally formed through-hole 18d through which the reel shaft 11 is loosely passed, and with a ring-shaped projection 18e formed concentric with the through-hole 18d and having inner teeth 18a formed on its inner circumferential surface.

The first locking member guide hole 18b and second locking member guide hole 18c are each formed to have a slot-shaped configuration. A guide pin 14c of the first locking member 14 is inserted into the first locking member guide hole 18b, and a guide pin 16c of the second locking member 16 is inserted into the second locking member guide hole 18c.

A biasing force acting to turn it in the direction of arrow A2 at all times is applied to the locking ring 18 by the spring member 21 provided astride the spring hanger 18f, which is formed on the locking ring 18, and the spring hanger 20a, which is formed on the tie plate 20.

A generally cylindrically shaped reel member 31 on which the seat belt 12 is wound is fitted on the reel shaft 11.

A hook retainer 23 is secured to the projection 13a of the ratchet wheel 13 situated on the outer side of the locking ring 18. A support pin 23a extending parallel to the axis of rotation of reel shaft 11 is provided on the peripheral portion of the hook retainer 23, and a hook 24 is disposed on the hook retainer 23 by being pivotally supported on the support 23a so as to be capable of rocking back and forth. A compression coil spring 25 is interposed between the hook retainer 23 and the hook 24 and biases the hook 24 so as to turn about the support pin 23a in the direction of arrow B1.

A pawl 24b capable of engaging the inner teeth 18a of locking ring 18 is formed on a portion of the outer periphery of hook 24, and a connecting pin 24a is formed on the hook 24 on the end thereof that rocks about the support pin 23a. Accordingly, when the hook 24 is being biased by the compression coil spring 25, the pawl 24b is spaced away from the inner teeth 18a.

The connecting pin 24a is fitter through a locking hole 26a provided in the outer periphery of a frictional locking member 26 formed to have a generally ring-shaped configuration. The ratchet wheel 28 formed to have a ratchet 28a on its outer circumferential surface is frictionally engaged with the outer periphery of the frictional locking member 26 via a spring member 27.

The first locking member 14 and second locking member 16 are freely rotatably provided on the outer side of one side face 10a of case 10 at positions corresponding to the first and second locking member guide holes 18b, 18c, respectively, of the locking ring 18.

The first locking member 14 is formed to have a pawl 14a at one end thereof so as to engage with the ratchet wheel 13, a guide pin 14c at its central portion, which guide pin 14c is inserted into the first locking member guide hole 18b of the locking ring 18, and a through-hole 14b at its other end. A pivot shaft (not shown) formed projectingly on the case 10 is passed through the hole 14b.

The second locking member 16 also comprises elements similar to those of the first locking member 14. These are a pawl 16a, a guide pin 16c and a through-hole 16b.

By engaging the first locking member 14 with the ratchet wheel 13, rotation of the latter in the direction of arrow A1 is inhibited.

An acceleration sensor 35 responsive to sudden acceleration is attached to the lower part of the case 10 on the one side face 10a thereof. As shown in FIGS. 1(a) and 1(b), the acceleration sensor 35 comprises a supporting case 35c, a cask-shaped inertial body 35a placed on the case 35c and adapted to be tilted by the action of acceleration approximately in the horizontal direction, and an actuator 35b rotatably displaced in a vertical plane in response to tilting of the inertial body 35a. The actuator 35b has a free end 35d adapted to engage the ratchet 28a, which is formed on the outer periphery of the ratchet wheel 28, when the actuator 35b has been displaced.

Figure 3:
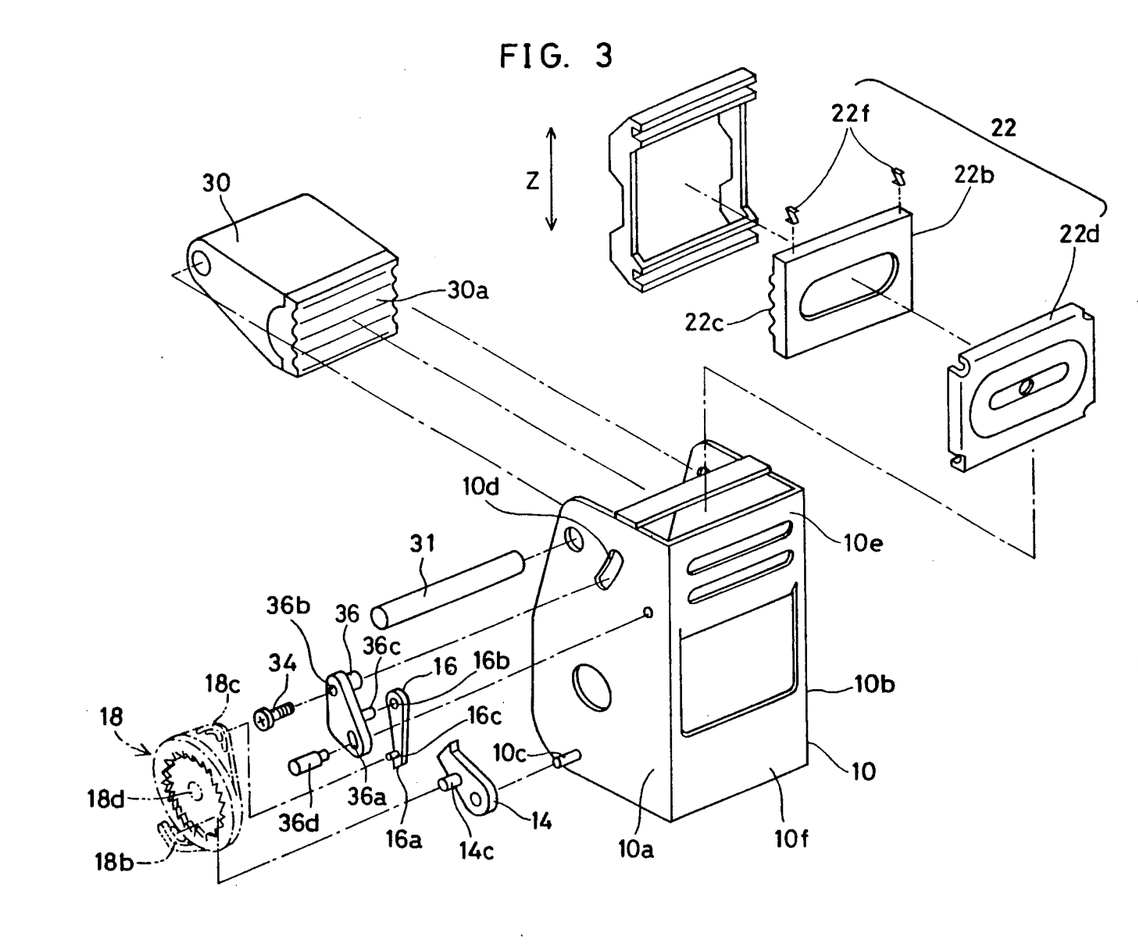
FIG. 3 is an exploded perspective view showing second emergency locking means.

The second emergency locking means 17 will be described in greater detail with reference to FIG. 3.

The second emergency locking means 17 has a sliding clamp member 22 attached to the case 10 so as to be capable of sliding in the directions in which the seat belt 12 is pulled out and taken up, and a turning clamp member 30 disposed opposite the sliding clamp member 22 for clamping and locking the seat belt 12 by operating in association with the locking action of the first emergency locking means 15.

The sliding clamp member 22 comprises a clamp frame 10e formed by bending a portion of the back 10f of case 10, a clamping member 22d attached to the clamp frame 10e so as to be capable of sliding in the directions in which the seat belt 12 is pulled out and taken up, an abutting member 22b retained by the clamping member 22d and formed to have a corrugated portion 22c on a surface which contacts the seat belt 12, and biasing members 22f, 22f which bias the clamping member 22d downwardly in the Z direction at all times.

The turning clamp member 30 is mounted so as to be turnable about a shaft 31 passed through the two side faces 10a, 10b of case 10 so as to span the same. A clamping portion 30a is attached to an end of the clamp member 30 that contacts the seat belt 12. The turning clamp member 30 is biased in the direction of arrow D2 by a return spring 32 shown in FIG. 1(c).

A transmitting member 36 comprising a generally triangularly shaped plate is attached to the intermediate portion of the turning clamp member 30 via a screw 34. The transmitting member 36 is formed to have an oblong through-hole 36a and a circular through-hole 36b in two end portions thereof, and one end thereof is formed to have a projecting shaft 36c. A pin 36d serving as the center of rotation of the transmitting member 36 is inserted into the oblong through-hole 36a, and the screw 34, which is for joining the turning clamp member 30 and the transmitting member 36 in such a manner that these are free to turn, is inserted into the circular through hole 36b. The shaft 36c is passed through the through-hole 16b formed in the second locking member 16, described below. Accordingly, the second locking member 16 is free to turn about the shaft 36c of the transmitting member 36.

The case 10 has a cut out portion 10d formed in such a manner that the case 10 will not interfere with the motion of the screw 34. The cut-out portion 10d is formed upon estimating the range of displacement of the turning clamp member 30.

Figure 4A:
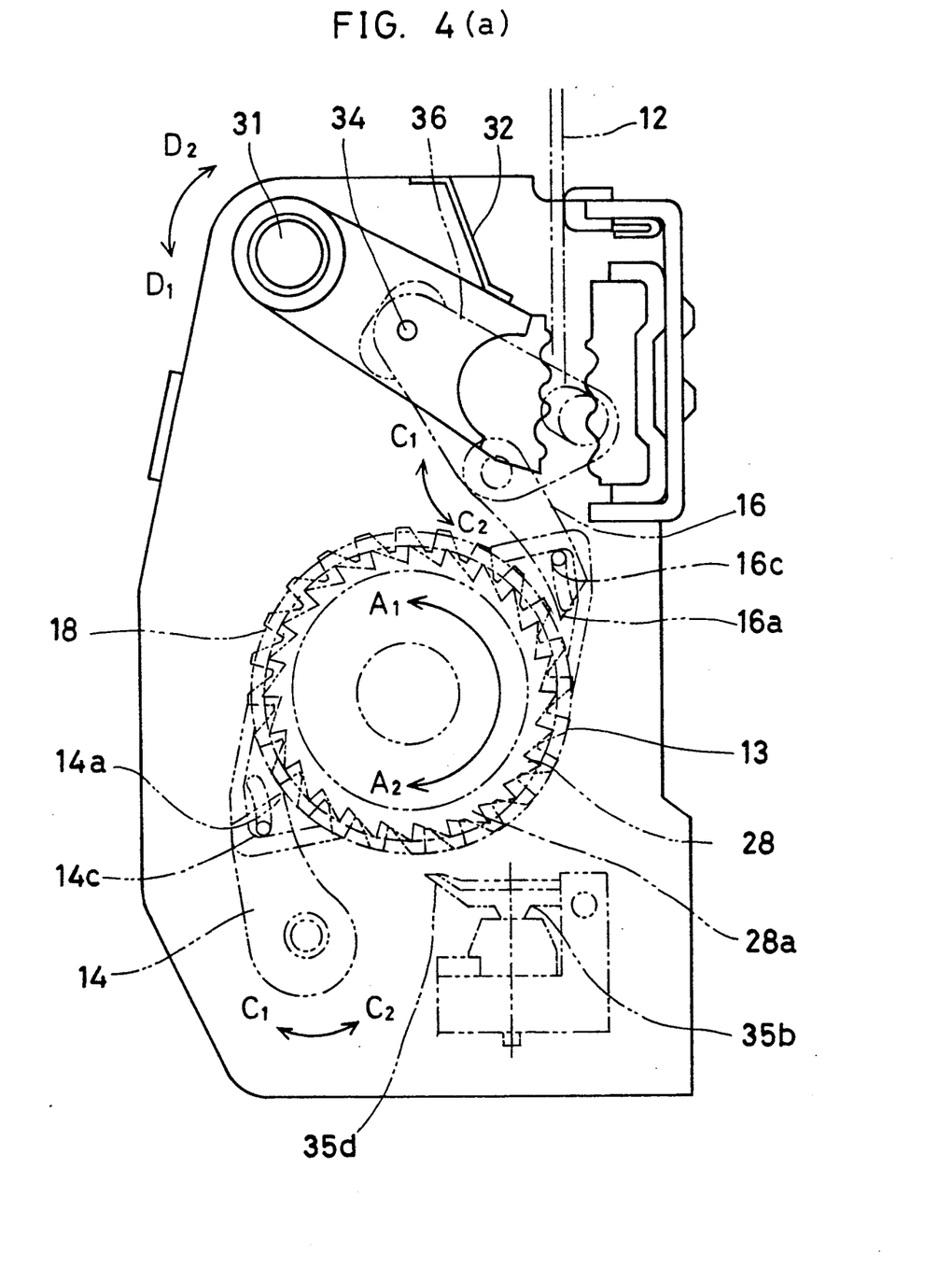
Figure 4B:
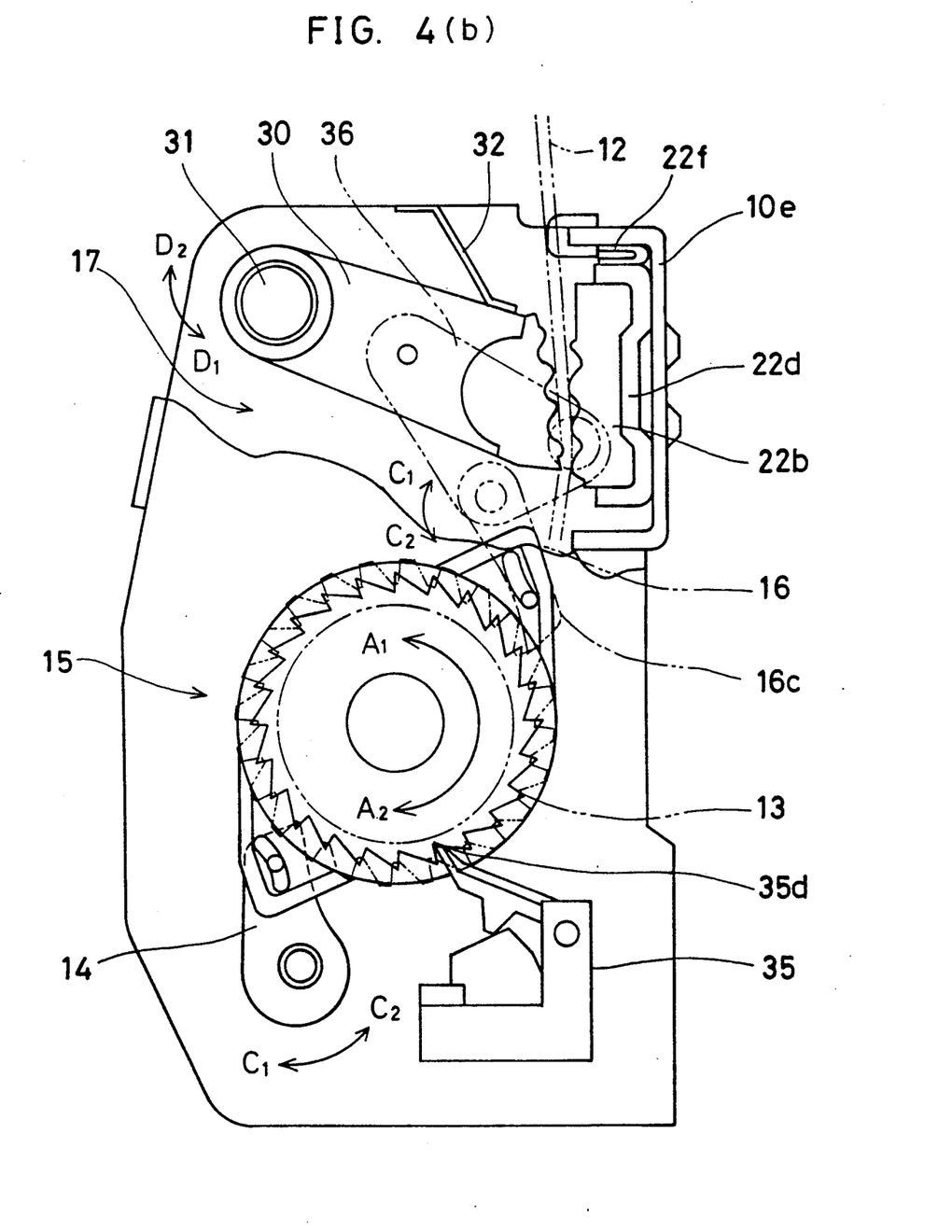

The operation of the apparatus according to this embodiment constructed as set forth above will now be described referring mainly to FIGS. 4(a), (b) and FIG. 5.

First, in the absence of sudden acceleration as produced by a collision, the seat belt 12 is acted upon by the biasing force of the restoration spring 19 [shown in FIG. 1(a)], and therefore the seat belt 12 is tensioned so as to be taken up on the reel shaft 11. In this case, the first and second locking members 14, 16 are not engaged with the ratchet wheel 13 [see FIG. 1(a)].

When sudden acceleration is sustained under these conditions, the actuator 35b of the acceleration sensor 35 turns so that its free end 35d engages with the ratchet 28a formed on the outer peripheral surface of the ratchet wheel 28a. When this occurs, the ratchet wheel 28 is rotationally displaced relative to the reel shaft 11 (in the direction of arrow A2).

The relative rotational displacement is transmitted to the hook 24 via the connecting pin 24a shown in FIG. 2(a), and the hook 24 is rocked about the support pin 23a in the direction of arrow B2 against the biasing force of the compression coil spring 25. As a result, the pawl 24b of the hook 24 engages with the inner teeth 18a of the locking ring 18, the turning force of the reel shaft 11 is transmitted to the locking ring 18 via the hook retainer 23, hook 24, pawl 24b and inner teeth 18a, and the locking ring 18 turns in the direction of arrow A1 against the biasing force of the spring member 21. Owing to rotation of the locking ring 18, the guide pin 16c of the second locking member 16 inserted into the second locking member guide hole 18c is moved along the guide hole 18c, whereby the second locking member 16 turns in the direction of arrow C1.

When the rotational displacement of the second locking member 16 in the direction of arrow C1 attains a predetermined angle, the first locking member 14 begins to turn in a direction to engage the ratchet wheel 13 from this point in time [see FIG. 4(b)].

When the pawl 16c of the second locking member 16 engages the ratchet wheel 13, the rotational displacement of the ratchet wheel 13 in the direction of arrow A1 is accompanied by rotational displacement of the transmitting member 36. During this displacement of the transmitting member 36, the first locking member 14 is not in the state where it is engaged with the ratchet wheel 13.

By virtue of this displacement, the turning clamp member 30 turns about the shaft 31 in the direction of arrow D1 to clamp the seat belt 12, which is disposed between the mutually opposing sliding clamp member 22 and the turning clamp member 30.

Owing to this clamping action, the clamping member 22d and the abutting member 22b, while resisting the biasing force of the biasing members 22f, 22f, slide upward in the Z direction in accordance with the rotational displacement of the turning clamp member 30. The seat belt 12 is locked as a result.

The arrangement is such that the first clamping member 14 is brought into engagement with the ratchet wheel 13 at the moment the seat belt 12 is reliably clamped.

Thereafter, the tension acting upon the seat belt 12 is released, whereupon the locking ring 18 turns in the direction of arrow A2 owing to the biasing force of the spring member 21. The first and second locking members 14, 16 therefore are turned back in the direction of arrow C2 and separate from the ratchet wheel 13. As a result, the first emergency locking means 15 is released, and so is the second emergency locking means 17 by the return spring 32 provided on the turning clamp member 30.

Thus, the seat belt 12 can again be freely pulled out or taken up.

Figure 5:
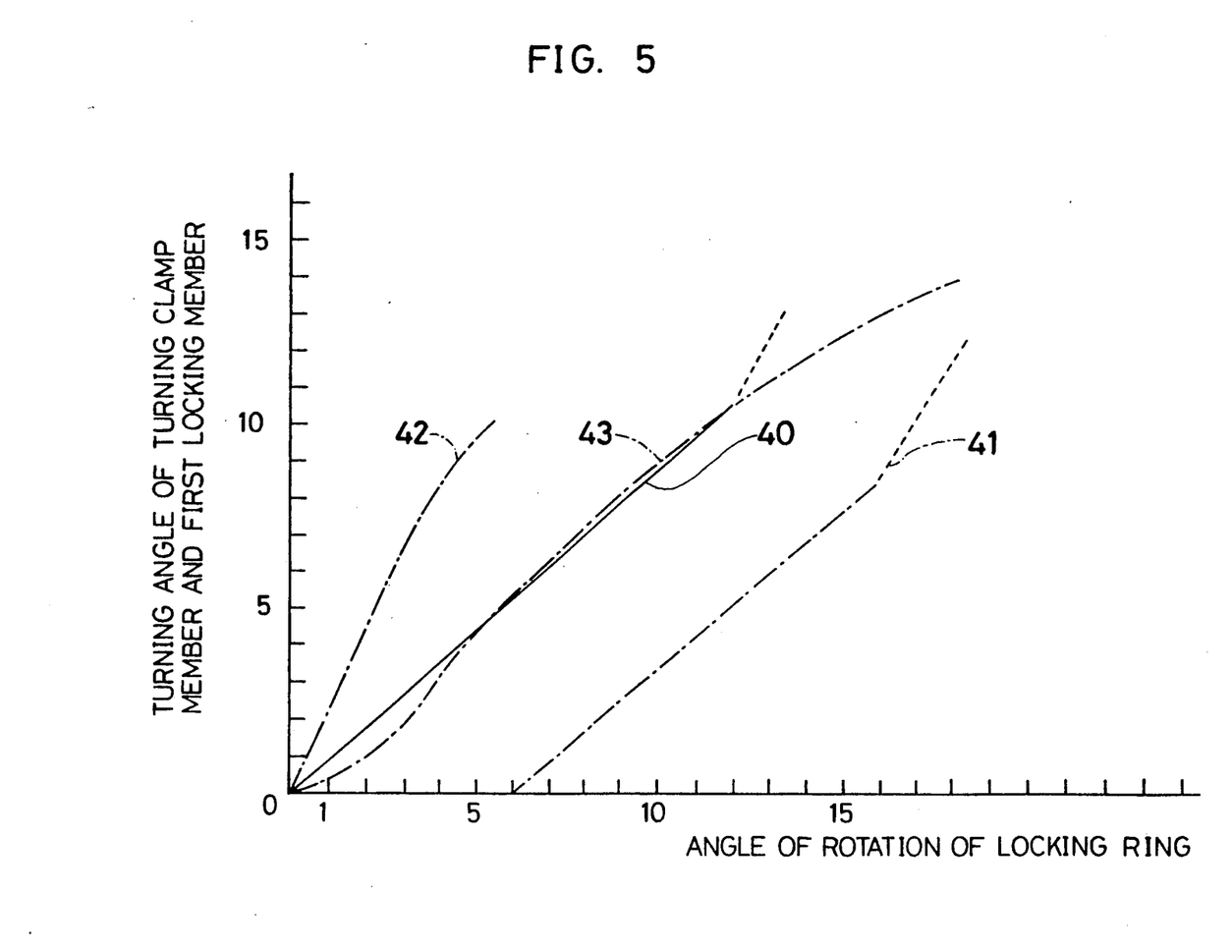
FIG. 5 is a timing chart showing the turning state of a turning clamp member and first locking member versus the angle of rotation of a locking ring.

FIG. 5 is a timing chart showing the turning state of the turning clamp member 30 and the first locking member 14 versus the angle of rotation of the locking ring 18. The angle of rotation of the locking ring 18 is plotted along the horizontal axis, and the angles of rotation of the turning clamp member 30 and first locking member 14 are plotted along the vertical axis.

In FIG. 5, numeral 40 denotes a rotational displacement curve indicating the rotational displacement of the turning clamp member 30 in the present embodiment, and numeral 41 denotes a rotational displacement curve indicating the rotational displacement of the first locking member 14. Further, numeral 42 shows a rotational displacement curve of the turning clamp member in the prior art, and 43 denotes a rotational displacement curve of the locking member in the prior art.

As shown in FIG. 5, the turning clamp member 30 (see curve 40) begins turning with the start of rotational displacement of the locking ring 18, and the first locking member 14 begins turning at the moment the locking ring 18 is rotationally displaced in excess of a predetermined angle.

More specifically, it is obvious from FIG. 5 that, in the present embodiment, the timing at which the reel shaft 11 is locked and the timing at which the seat belt 12 per se is clamped and locked can be adjusted independently of each other. By contrast, the prior-art apparatus is such that both elements are rotationally displaced simultaneously along with the turning of the locking ring, and adjustment of the timings cannot be performed independently of each other.

In accordance with the apparatus of the embodiment described above, the first and second locking members 14, 16 are separately provided, and these are turned by the shared locking ring. As a result, the actuation timings of the first and second emergency locking means 15, 17 can be adjusted independently of each other. Moreover, adjustment of the actuation timings in this embodiment can be performed very easily by suitably designing the shapes and lengths of the first locking member guide hole 18c and second locking member guide hole 18b provided in the locking ring.

Further, the second emergency locking means 17 is actuated in operative association with the first emergency locking means 15, and the mechanism for achieving this operative association is realized merely by interposing the locking ring. This means that the mechanism is greatly simplified while reliability is enhanced remarkably at the same time. In addition, this contributes to a reduction in the size and weight of the apparatus.

It will be apparent from the foregoing description that the present invention provides a seat belt retractor in which it is possible to readily adjust the timing at which the reel shaft is locked against rotation and the timing at which the seat belt is locked by being clamped.

As many apparently widely different embodiments of the present invention can be made without departing from the spirit and scope thereof, it is to be understood that the invention is not limited to the specific embodiments thereof except as defined in the appended claims.

What we claim is:

1. A seat belt locking and clamping means for use on a seat belt in a vehicle for restraining a party to whom said seat belt is applied comprising:

first emergency locking means having a ratchet wheel coaxially and integrally attached to a reel shaft which rotates freely as a wound seat belt is extracted by said party to whom said seat belt is applied and said seat belt is taken up, and a first locking member capable of being positionally displaced to engage with and disengage from said ratchet wheel, said reel shaft being locked against rotation by engaging said first locking member with said ratchet wheel;

second emergency locking means having a second locking member positionally displacable for engagement with and disengage from said ratchet wheel, seat belt clamping and locking means connected to said second emergency locking means for clamping and locking said seat belt when said second locking member engages said ratchet wheel; and a link member for engaging said first and second locking members with said ratchet wheel independently of each other in response to detection of sudden acceleration of said party to whom said seat belt is applied by sudden deceleration of said vehicle and for disengaging said first and second locking means when said sudden acceleration of said party and said sudden deceleration of said vehicle terminates.

* * * * *